INVENTOR.
EDWARD J. RABENDA
BY
William V. Schelberg
AGENT

March 15, 1960 E. J. RABENDA 2,928,594

ACCUMULATING REPRODUCER

Filed Nov. 26, 1954 10 Sheets-Sheet 2

INVENTOR.
EDWARD J. RABENDA

BY William V. Schelling
AGENT

March 15, 1960 E. J. RABENDA 2,928,594

ACCUMULATING REPRODUCER

Filed Nov. 26, 1954 10 Sheets-Sheet 3

INVENTOR.
EDWARD J RABENDA
BY
William V. Schelberg
AGENT

INVENTOR.
EDWARD J. RABENDA
BY William V. Schellberg
AGENT

INVENTOR.
EDWARD J. RABENDA

BY William V. Schelberg
AGENT

March 15, 1960 E. J. RABENDA 2,928,594
ACCUMULATING REPRODUCER
Filed Nov. 26, 1954 10 Sheets-Sheet 6

INVENTOR.
EDWARD J. RABENDA
BY William V. Schellberg
AGENT

INVENTOR.
EDWARD J. RABENDA
BY William V. Schelberg
AGENT

March 15, 1960 E. J. RABENDA 2,928,594

ACCUMULATING REPRODUCER

Filed Nov. 26, 1954 10 Sheets-Sheet 9

March 15, 1960 E. J. RABENDA 2,928,594
ACCUMULATING REPRODUCER
Filed Nov. 26, 1954 10 Sheets-Sheet 10

INVENTOR.
EDWARD J. RABENDA
BY
William U. Schelberg
AGENT

United States Patent Office 2,928,594

Patented Mar. 15, 1960

2,928,594

ACCUMULATING REPRODUCER

Edward J. Rabenda, Poughkeepsie, N.Y., assignor to International Business Machines Corporation, New York, N.Y., a corporation of New York Application November 26, 1954, Serial No. 471,427

14 Claims. (Cl. 235—61.6)

The present invention relates to information handling apparatus and is directed in particular to an accumulating reproducer system employing decade counters of the cold cathode glow transfer type with means accommodating such counters for use with business records or other apparatus in which information distinguished by predetermined code designations is employed.

In accordance with one broad object of the invention a system is provided wherein information available in coded form is converted into decimal form for storage and accumulation in decade counters and thereafter, operation of the counters is controlled so as to provide a coded output.

Another object of the invention is to provide a photoelectric pulse producing system wherein a slotted code disc is employed for converting information from one code to another and which is readily adapted for employment with any weighted code.

In the system to be described in illustration of the invention, use of an accumulator reproducer is contemplated in conjunction with record cards bearing designations recorded in accordance with a so-called modified 1—2—4—8 binary code. With this code the decimal digits 1, 2, 4 and 8 are represented by single binary digits while a decimal 3 is represented by binary digits in the 1 and 2 positions, a decimal 5 by binary digits in the 1 and 4 positions, a decimal 6 by binary digits in the 2 and 4 positions, a decimal 7 by binary digits in the 1, 2 and 4 positions and a decimal 9 by binary digits in the 1 and 8 positions. A record card bearing information recorded in accordance with such a modified binary code is termed hereafter an Increased Capacity Card and is shown in detail, for example, in the copending United States patent application, Serial No. 358,101, filed May 28, 1953, now Patent No. 2,774,429. It is to be understood, however, that the invention is not to be considered limited to the specific source of coded input information or to the code herein illustrated.

A decimal type cold cathode glow counter tube of the type disclosed and claimed in the copending United States patent application, Serial No. 301,675, filed July 30, 1952, now Patent No. 2,837,276, is employed for accumulation, but with photocell gating apparatus utilizing a slotted code disc which rotates between a light source and a photocell whereby modified binary 1, 2, 4, 8 signals or other diverse coded information representations may be converted to a decimal code for accumulation by the decimal tube. In the system to be described, other operating control impulses are likewise developed by photocell gating pulses, and read out of the decimal counter tubes is under the control of a further rotating code disc having code control slots arranged and adapted to cause a conversion in the output signals delivered by the apparatus to a recorder, for example, which is also operated in accordance with the modified binary 1, 2, 4, 8 code.

Accordingly, a more specific object of the invention is to provide an accumulator system including photoelectric pulse gating apparatus for converting information in one coded form to decimal form and means for entry of the decimal information into glow transfer decade counter with means including further photoelectric pulse gating apparatus for providing a reconversion of selected portions of the applied information for recording in the same or another code form.

Other objects of the invention will be pointed out in the following description and claims and illustrated in the accompanying drawings, which disclose, by way of example, the principle of the invention and the best mode, which has been contemplated, of applying that principle.

In the drawings:

Figures 1 to 8 taken together and positioned as shown in Figure 9 provide a circuit diagram of the system.

Figure 10A:
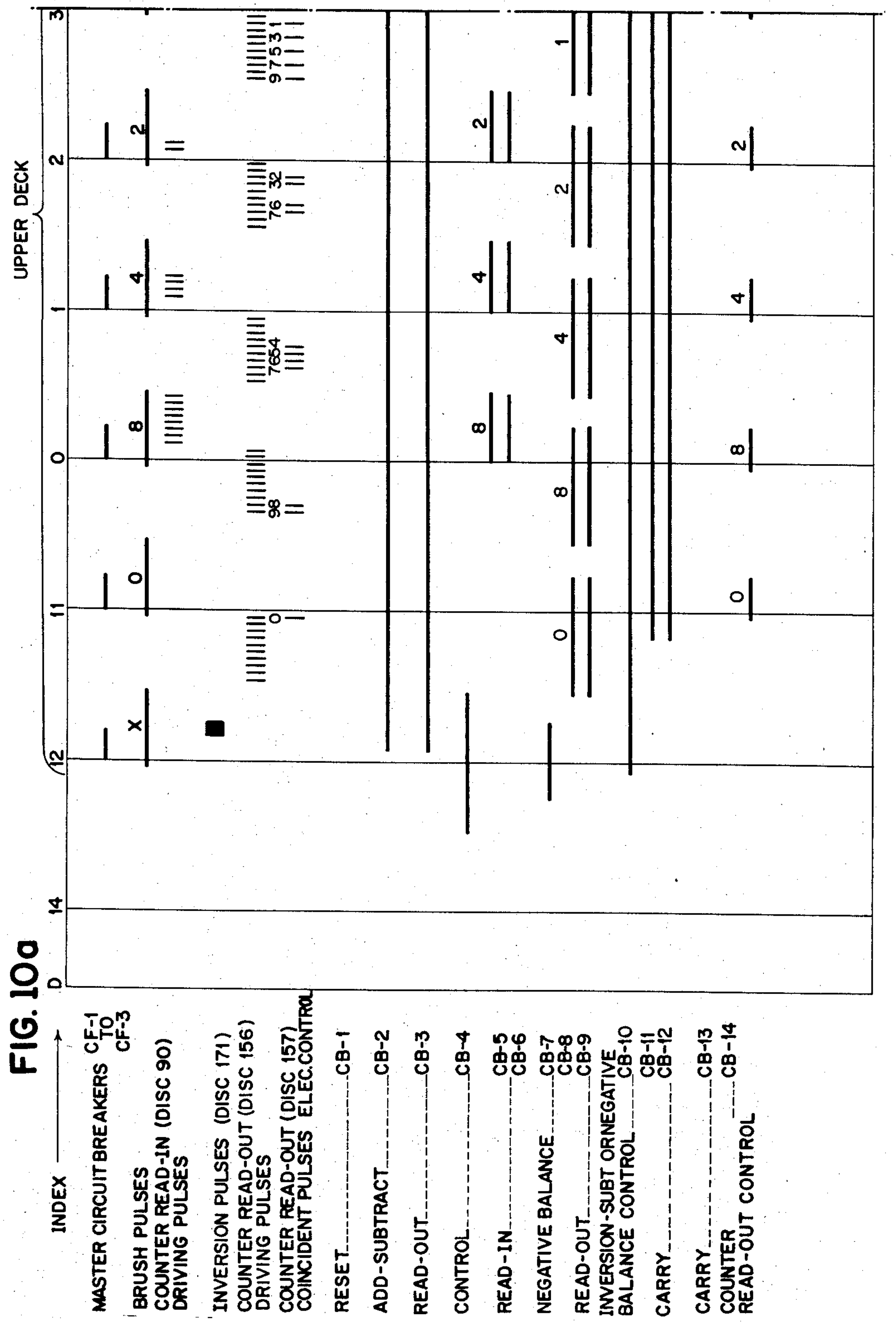
Figure 10B:
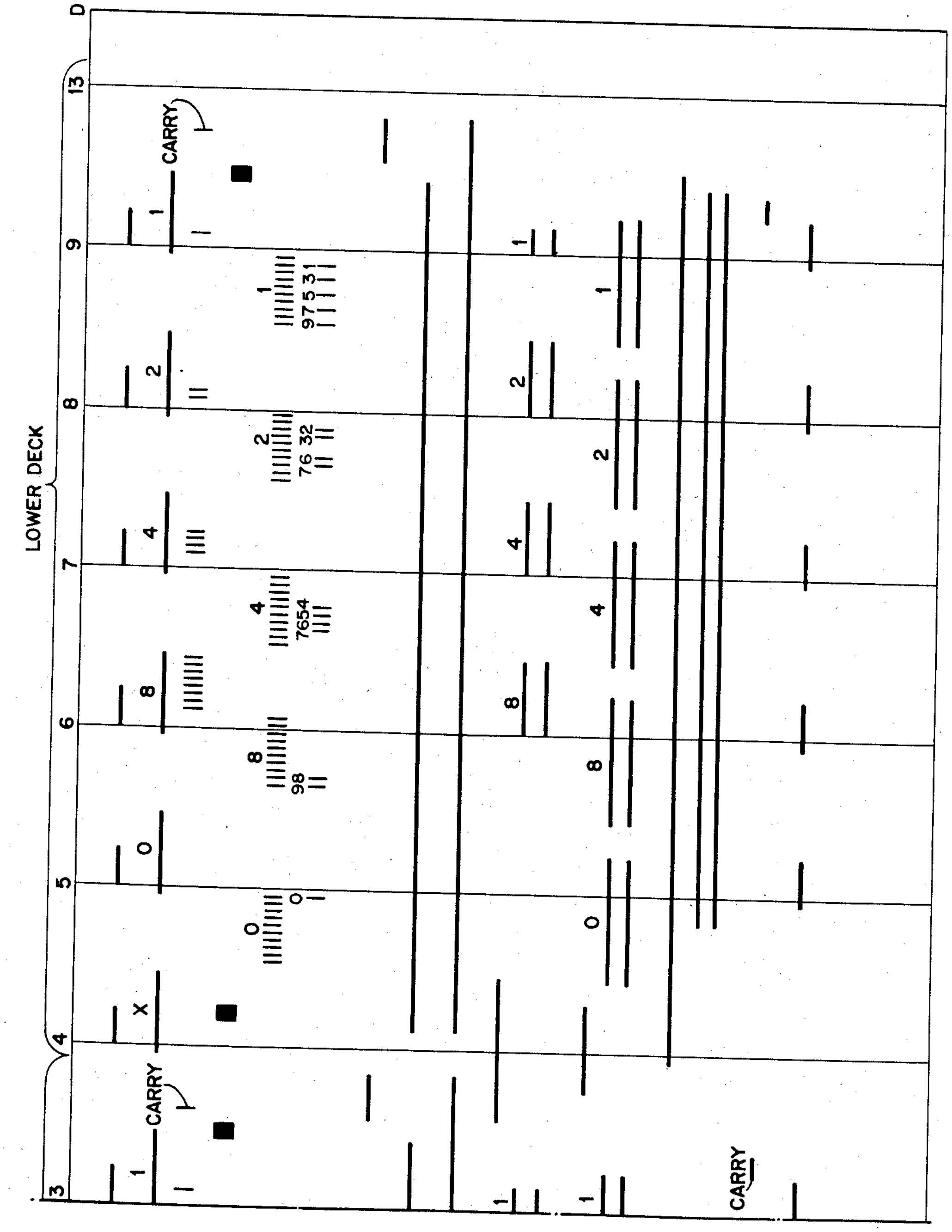

Figures 10*a* and 10*b* comprise a timing chart showing the periods of closure of the contacts and the control pulses produced by the photocell systems employed in the apparatus.

Figures 7, 8, 9, 11:
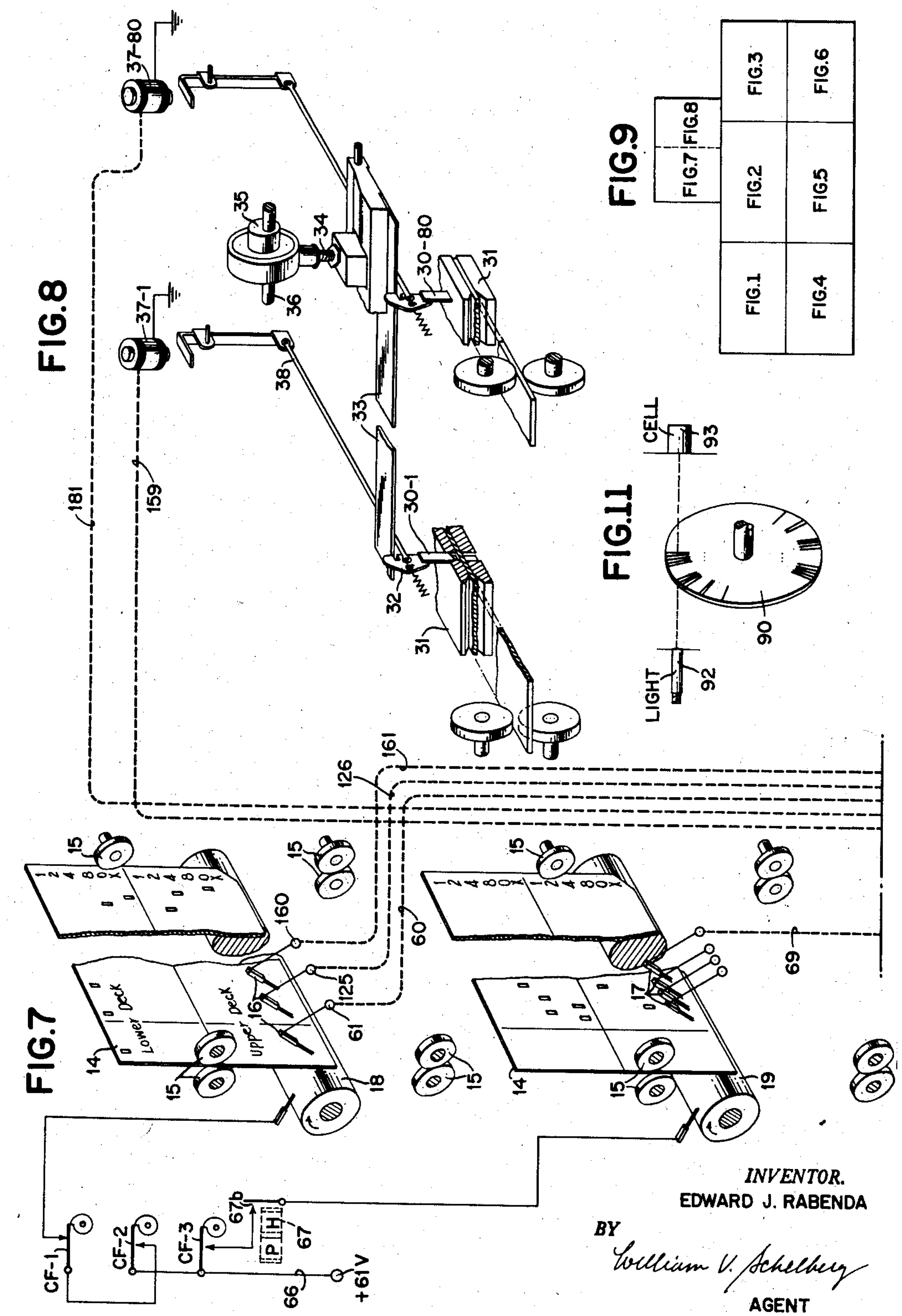
Figure 7 illustrates a card sensing device forming a source of information representing impulses applied to the system.
Figure 8 illustrates a recording device to which information is directed by the system after the functions of the accumulator have been performed.
Figure 9 illustrates the arrangement of figures forming the complete circuit diagram.

Figure 11 is a schematic showing of the arrangement of light source, photoelectric cell and control disc employed in each pulse control device.

Figures 12*a* to 12*d* illustrate the several control discs used in the photoelectric system for producing pulses employed for read in, read out, inversion and other control functions of the reproducer system.

Figure 1:
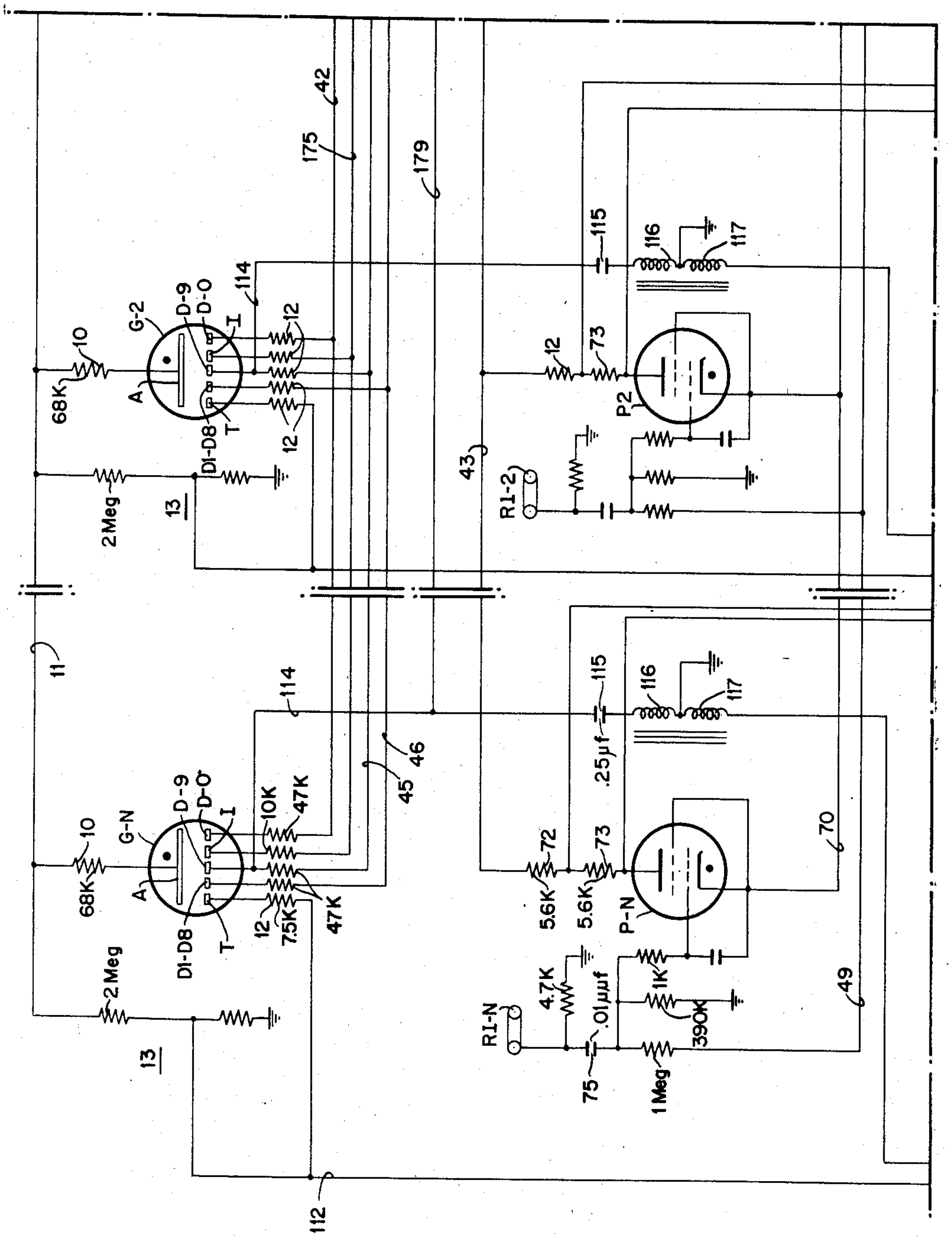

As mentioned heretofore, the accumulator employed in the present invention is of the cold cathode glow transfer type, such as that disclosed and claimed in the copending United States patent application, Serial No. 301,675, filed July 30, 1952, now Patent No. 2,837,276, and need only be briefly described here for an understanding of the invention. Referring now to Fig. 1 of the drawing, a plurality of counter tubes designated G–1 to G–N are provided to accommodate the number of orders desired, with each tube G having ten digit representing cathodes labeled D0 to D9 and a like number of interspersed transfer cathodes T arranged in a closed glow transfer path, with a single anode A spaced equidistantly from each of the cathodes. The digit cathodes prefixed D, are physically arranged so that ones representing complementary values of nine are adjacent one another with pairs of inversion cathodes labeled I arranged therebetween to allow a bidirectional glow transfer. The digit cathodes for the decimal values 1 to 8 are commonly connected and the transfer cathodes T as well as the inversion cathodes I are likewise commonly connected and illustrated as a single element in the drawings to avoid duplication of circuitry. The D9 and D0 digit cathodes are provided with individual circuits, and are shown as separate elements for a purpose to be later described. The anode A of each tube G is connected through an individual resistor 10 to a conductor 11 that is energized at +500 volts by a source not shown. The several cathodes of each tube are connected through individual resistors 12 to a less positive source of potential through circuitry also to be later described. The transfer cathodes T are normally biased to a less positive potential through a resistor divider network designated 13 which is connected between the line 11 and ground. Circuits are likewise provided for each of the T and I cathode elements with pulses applied thereto in causing the tubes to function.

For purposes of explanation, it is assumed that a stable glow discharge persists between the digit cathode D0 and the anode A. A negative pulse applied to the transfer cathode circuit causes the voltage difference between all the cathodes T and the anode to become greater than that between any one of the digit cathodes and the anode. The transfer cathodes that are adjacent the D0 cathode are in a region of more intense ionization and the discharge transfers to one of them in a direction determined by a preference mechanism which allows the shift to take place in only one direction. When the pulse applied to the transfer cathode circuit terminates, the voltage difference between the digit cathodes and anode becomes the greater and the glow transfers to the D1 digit cathode, being in the preferential direction. Application of further pulses cause a progressive transfer of the glow to a succeeding higher value representing digit cathode in a similar manner. The inversion cathodes I are commonly connected as mentioned above and are pulsed simultaneously as a group, like the T cathodes, but to cause a self-complementing action. Assuming the initial glow discharge to be from the anode A to the D0 cathode, and recalling that complement representing ones of the digit cathodes are adjacent one another with an I cathode intermediate them, a negative pulse applied to the I cathode circuit causes the glow to prefer the adjacent I cathode rather than the D0 cathode. When this pulse is relaxed, the glow prefers a digit cathode and, due to the preference device provided, migrates to the D9 cathode. A further I cathode is provided between complement representing digit cathodes and has a preference direction in a reverse sense so that a second negative pulse applied on the I cathode circuit causes a recomplementing action and, for the example taken, the glow transfers from the D9 cathode back to the D0 cathode.

Another basic component of the system to be described is the card sensing mechanism shown schematically in Fig. 7. Here a record card 14 of the Increased Capacity type is illustrated having two decks each with a plurality of vertical columns of digit representing perforation positions 1, 2, 4, 8 and two control positions X and O. The cards are fed successively from a supply hopper (not shown) to sets of feed rollers 15 which convey the cards past a row of upper sensing brushes 16 and then past a row of lower sensing brushes 17. The brushes make contact through the usual perforations with conductive rollers 18 and 19 and are spaced apart so that they concurrently sense the same index positions of successive cards with the distance between the two rows of brushes representative of a complete card cycle.

Driven with the feed rollers, are a number of cam operated contacts timed as shown in Figs. 10*a* and 10*b*. These contacts are prefixed CB or CF and the heavy lines in the diagram represent the period during the card feed cycle when these contacts are closed.

Each record card has a field constituting a plurality of columns in which perforations representing an amount are made, and a control field by which perforations in the X position in a selected column indicate if the numerical value represented is a plus or minus value or to add or subtract the value from the total standing in the counter tubes G. A read out operation is likewise controlled by a perforation in the X position of a further selected card column, however, each of these functions may be controlled by perforations in other positions as desired.

The device employed for illustration of a recorder comprises a punch unit shown in schematic form in Fig. 8. It will be understood that other recorder devices such as a printer may be employed with equal facility or the output of the reproducer directed to other information handling system. Eighty punch elements 30 and coacting punch dies 31 are provided, one for each column of the card but with only the first and last elements being shown in the figure. All like index positions are punched simultaneously as the card is fed through the unit, with the card maintained at rest when punching occurs and moved intermittently between punching operations by a conventional Geneva type drive mechanism not shown. Each of the punch elements 30 pivotally carries an interponent 32 which is normally out of the path of motion of a continuously oscillating punch depressor plate 33. The plate 33 or punch bail is operated through connecting rods 34 by eccentrics 35 mounted on a rotating shaft 36. The operating magnets 37, upon energization, act through an armature lever and link 38 to hook the interponent 32 to the bail 33 during its downward stroke and accordingly, the selected punch elements 30 are driven through the card to produce a perforation.

At the outset of operation of the present accumulator reproducer system, it is necessary to reset the counter tubes G to zero if not already in such condition. When current is initially applied to the machine, a glow may be manifested at some indeterminate digit cathode position and, to ensure that at the commencement of operations all tubes are set at zero, a cam operated contact CB1 (Fig. 3) closes prior to card sensing, as shown in the timing chart (Fig. 10). Closure of CB1 energizes a reset relay 40 through closed contacts 41–*a* of a read out relay 41, the latter being energized on clearing the machine as will later be described. The reset relay 40 shifts its contacts 40–*a* (Fig. 2) so that a circuit is completed from ground through the 40–*a* contacts to a line 42 and thence in parallel to the zero cathodes D0 of the several tubes G, grounding each of these cathodes. Due to the greater voltage drop now present between the anode A and the D0 cathode of each tube, a glow will be established therebetween which remains after release of the CB1 contacts and deenergization of the reset relay 40. As this occurs, the contacts 40–*a* are caused to reclose to their normal position and reconnect the line 42 to a +135 volt line 43. Resistors 44 are provided to bridge the normally closed contact 40–*a* so that the D0 cathodes are always connected to the line 43 during transfer of the contacts.

Provision is also made to indicate if any of the tubes G fail to reset upon operation of the CB1 contacts and for this purpose further contacts 40–*b* and 40–*c* of the relay 40 are provided in series with leads 45 and 46 connected to the accumulator cathodes D1 to D8 and D9. Assuming that a glow exists to one of these cathodes, a voltage drop exists between the +135 volt line 43 across a resistor 48 after the contacts 40–*b* and 40–*c* have reclosed. At the time that the reset relay 40 closed its contacts 40–*d*, a −100 volt line 49 was coupled to the control grid of a triode 50 preventing conduction therein. The plate of this tube connects with the grid of a further tube 51 (shown in the same envelope) and establishes conduction from the +500 volt line 11, through a resistor 52 of a voltage divider comprising resistors 52 and 53. Whenever one or more of the accumulators G fails to reset to zero, a voltage change is thus developed at a terminal 55 connected to the junction of the resistors so as to initiate the operation of further signal devices or for stopping the machine as may be desired.

As mentioned previously, functioning of the system is controlled primarily by the presence of perforations in the X position of a record card which direct the apparatus to add, subtract, read out, etc. As noted on the timing chart of Fig. 10, all timings shown for the first half of the machine cycle are applicable to the upper deck of the Increased Capacity Card and are duplicated in the second half of the machine cycle for the lower deck. This means that any function described hereafter can occur for either the upper and/or lower deck of the same card and to avoid repetition, only one deck will be considered.

In performing addition, any one of several counter groups which may be provided is set up by means of a plugwire 60 connecting a hub 61 at the reading brush station (Fig. 7) corresponding to the predetermined column for the X "add" control perforation, with the other end of the wire 60 connected to the "add" control hub 62 (Fig. 3) of the counter group to be used for accumulation, only one group being illustrated in the drawing. Before the X control perforation in the card is read at the upper sensing station, a set of cam contacts designated CB4 are closed for a period as shown in the timing chart of Fig. 10 and a relay 65 (Fig. 3) is picked up and held energized while the master circuit breakers CF1—CF3 (Fig. 7) are made for the "X" card row. At a time corresponding with the "12" index of the machine sensing cycle ("4" for the lower deck) the following circuit is completed from the +61 volt line 66, master circuit breakers CF1 and CF2, reading contact roll 18, through the X perforation in the card 14, reading brush 16, lead 60, "add" control hub 62 for the counter group to be controlled, relay point 65-a and through an add pick up relay coil 67P to ground.

A holding circuit for the add relay 67 is completed through a circuit traced from a +40 volt line 68, CB2, add point 67a and the hold coil 67H to ground. The add relay 67 will thus be held energized for the duration of the adding portion of the cycle.

The next step requisite to performing addition is the directing of coded information pulses representative of the data to the several accumulators G. For this purpose a group of pluggable connections 69 are provided from the lower reading brushes 17 (Fig. 7) corresponding to the card columns from which accumulation is to originate. These connections are made to hubs labeled RI-1 to RI—N of the counter group in which the function is to be performed and, at a time corresponding to the 0—1—2—3 of the machine index time, a circuit is completed to the cathode of a tube P provided for each order. This circuit may be traced as follows: cathode of each read in unit P, a common lead connection 70 to a pair of cam operated switches CB5 and CB6 (Fig. 3) and thence to ground. The time of closure for the contacts CB5 and CB6 and the master circuit breaker CF are identical as seen from the timing chart. The plate electrode of each read in tube P is connected directly to the +135 volt line 43 through a pair of resistors 72 and 73 in series. As the lower reading brushes 17 sense the 8—4—2—1 holes in the record card successively, a circuit is completed to the read in hubs RI of each tube P and a +61 volt pulse is transmitted through contact CF3, add relay contacts 67b, the contact roll 19 and through a condenser 75 to the read in tube grid circuit. A sufficiently high negative bias is normally maintained on the grids through a connection to the line 49 to insure against any influence on the tube due to stray capacitance or extraneous pulses. As the brush 17 senses a hole in the card the positive 61 volt pulse supplied is sufficiently high to overcome this negative grid bias and allow the tube to conduct. Being a 2D21 type gas tube, it will continue in a conductive state, once triggered, until the cathode circuit is opened by operation of CB5 and CB6.

Assuming the tube P to be turned on as a result of the sensing of a perforation, the next step is to determine the process whereby the value represented by a single differential pulse or by plural differential pulses is accumulated in the tube G. As discussed previously, the counter tubes are arranged to accumulate in accordance with the decimal system with an individual pulse required for causing each separate advance in the glow position. The source of advancing pulses provided in accordance with the invention comprises a means for converting the information sensed in one code form to decimal form so that it may be employed by the tube and includes a photoelectric pulse producing system whereby a light beam is focused upon a photoelectric cell with a rotatable disc located between the light source and the cell.

Figure 6:
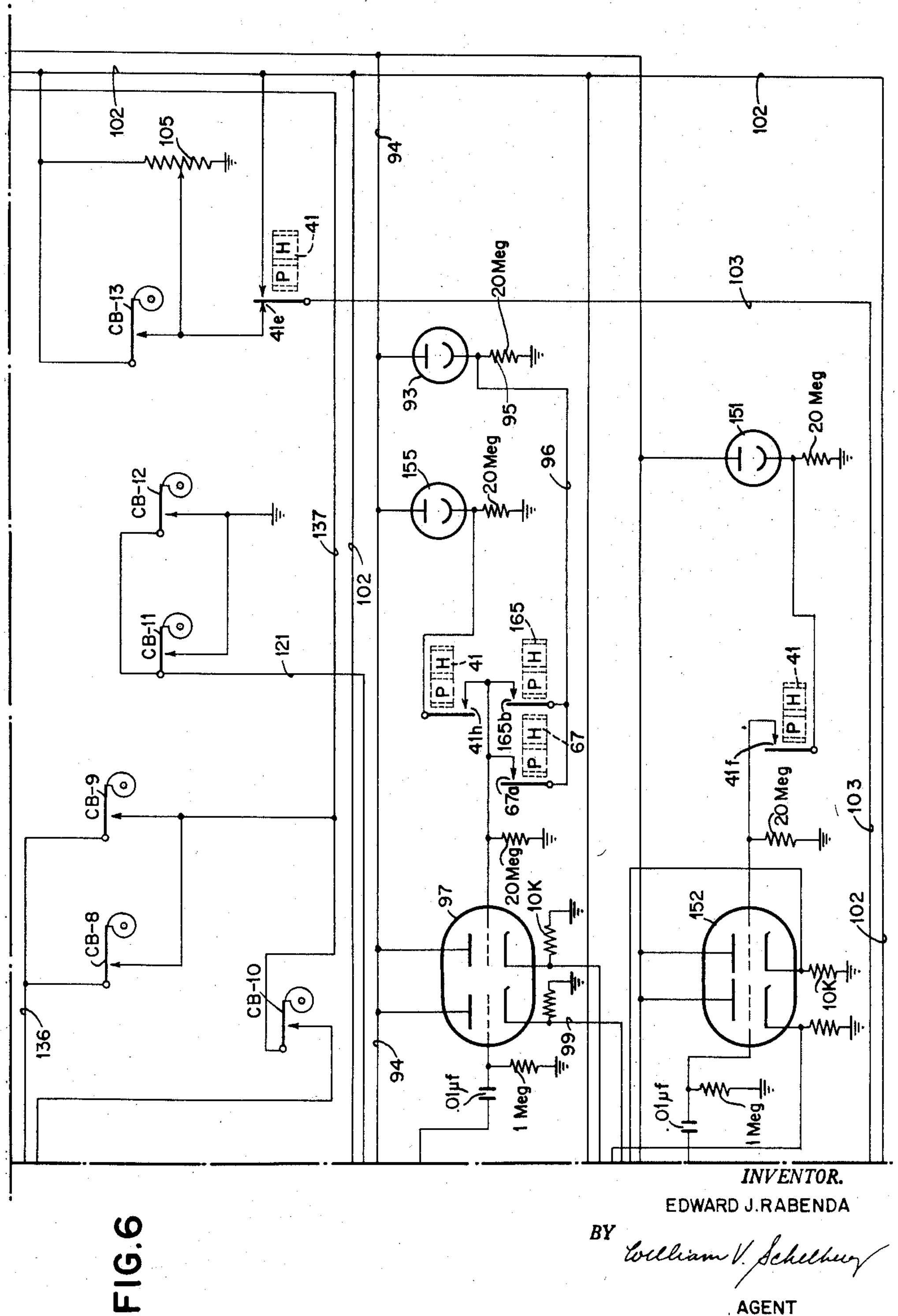
Figure 12A:
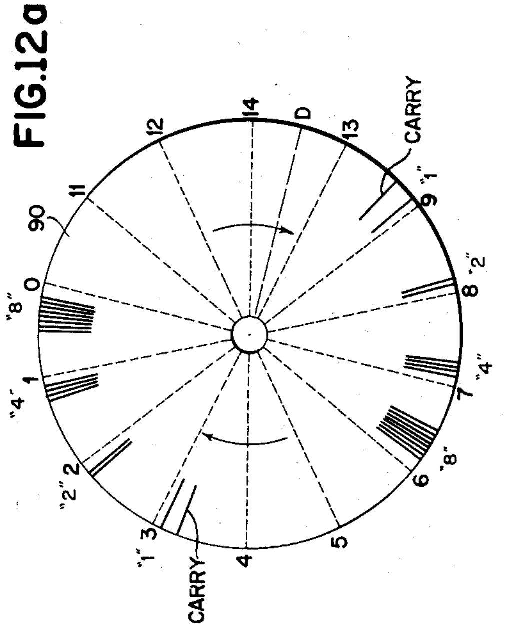
Figure 12D:
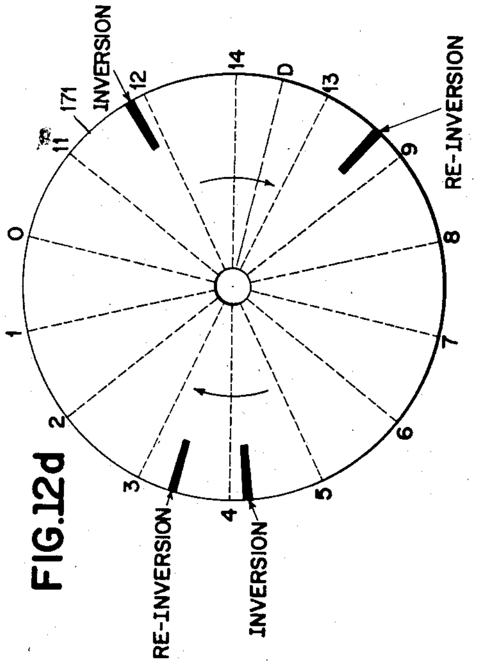

The general arrangement of the light source, disc and photocell is illustrated schematically in Fig. 11 where the disc employed for translating the differential pulses derived from the card in accordance with the example taken of a modified binary 1—2—4—8 code, is an opaque member 90 having groups of slots or transparent regions radially arranged around the periphery to allow passage of pulses of light therethrough from a source 92 to a cell 93 as the disc is rotated at a prescribed rate. With the code employed for illustration the disc contains 8 slots for the 8 card index position, 4 slots for the 4 position, etc., and is rotated at a rate whereby the linear speed at the radial distance at which the light source and cell are positioned corresponds with the rate of travel of the record card 14 past the sensing brushes 17. The disc 90 employed for read in control is illustrated in Fig. 12a with the dark regions representing the transparent slots with the remainder of the disc opaque. The code disc 90 is rigidly mounted on a shaft (not shown) so as to be driven in synchronism with the card feed apparatus and, as the reading brush is positioned for the "1" index row on the card, the disc is positioned to allow light to be transmitted through the single slot. Similarly, when the card index rows 2, 4 and 8 are sensed, the slot groups corresponding thereto are rotated to a position to allow 2, 4 and 8 discrete light pulses to pass as indicated in the timing chart of Fig. 10. The photoelectric cell 93 is illustrated diagrammatically in Fig. 6 of the circuit drawings with the plate side connected to a lead 94 which is held at +135 volts and the cathode side connected to ground through a 20 meg. ohm resistor 95. For the 1—2—4—8 Increased Capacity Card illustrated, and the disc 90 slotted accordingly, at the period the 8 row is sensed in the record card the disc rotates through an angle sufficient to allow 8 light pulses to be directed to the cell 93 and eight distinct conductive periods insure causing a like number of positive pulses to develop at the cathode side of the cell 93 and appear on a lead 96 connected thereto. These pulses are directed through now closed contacts 67a of the previously energized add relay 67, and are transmitted to a "one shot" multivibrator and amplifier arrangement consisting of a 12AU7 tube 97 a 6J6 tube 98. The plate side of each of these tubes is connected to the +135 volt lead 94 and their cathodes are grounded. Amplified pulses corresponding to the weighted perforation value are therby transmitted from the cathode of the tube 97 via a lead 99 to the grid of a counter drive tube designated as element C provided for each accumulator order tube G.

The driver tube C is a triode-pentode converter with the triode grid potential normally held at a positive value to keep this side in a conductive state when the read in unit is off or non-conducting. A voltage divider 101 is connected at one side through a lead 103, a set of contacts 41e and a variable resistor 105 (Fig. 6) to a lead 102 held at −100 volts. The other side of each divider 101 is connected to the plate of the tube P for the particular order and to the +135 volt line 43 through the aforementioned resistors 72 and 73. As long as the triode side of tube C remains conductive, the pentode side will be held off due to the connection through a lead 100, however, as soon as the card sensing brush 17 detects a hole in the record card and the tube P is triggered, the potential at its plate terminal will be less positive. This voltage decrease lowers the grid potential of the triode section of tube C sufficiently to cause non-conduction and as this takes place it is possible to cause the pentode side to conduct.

As previously mentioned, pulses developed on the lead 99 as a result of the functioning of the photocell 93 and tubes 97 and 98, are directed to the control grid of the pentode side of tube C. These pulses are of positive polarity and result in the grid bias being changed so as to periodically trigger this section of the tube on. The plate 110 of the pentode side will then change its voltage intermittently as pulses are supplied to the grid.

Considering for an example the addition of the value 8 into the counter tube G, eight slots are provided in the disc 90 for the index position representing the digit 8 and the pentode is caused to conduct eight consecutive times through the circuitry described. Eight changes in potential are developed at the anode 110 and are transmitted to the commonly connected transfer cathodes T of the corresponding order counter tube G through a lead 112.

Each negative voltage swing applied through this circuit to the transfer cathodes causes the glow discharge to advance one digit position until a total of 8 advances are accumulated. If a particular counter were initially standing at zero, no further action takes place, however, if the glow advances through one complete counter cycle, a carry function takes place as will now be described.

Figure 3:
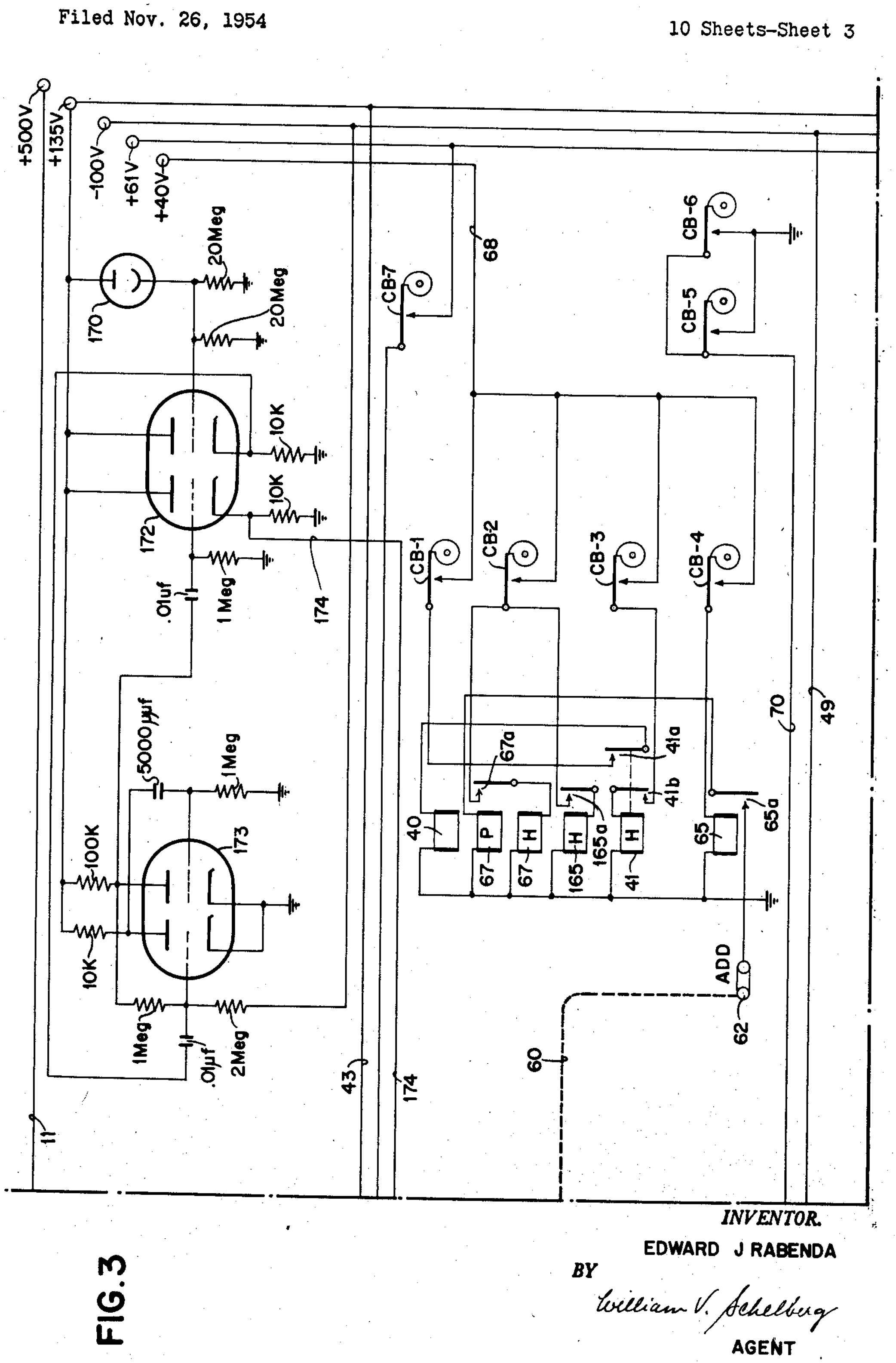
Figure 4:
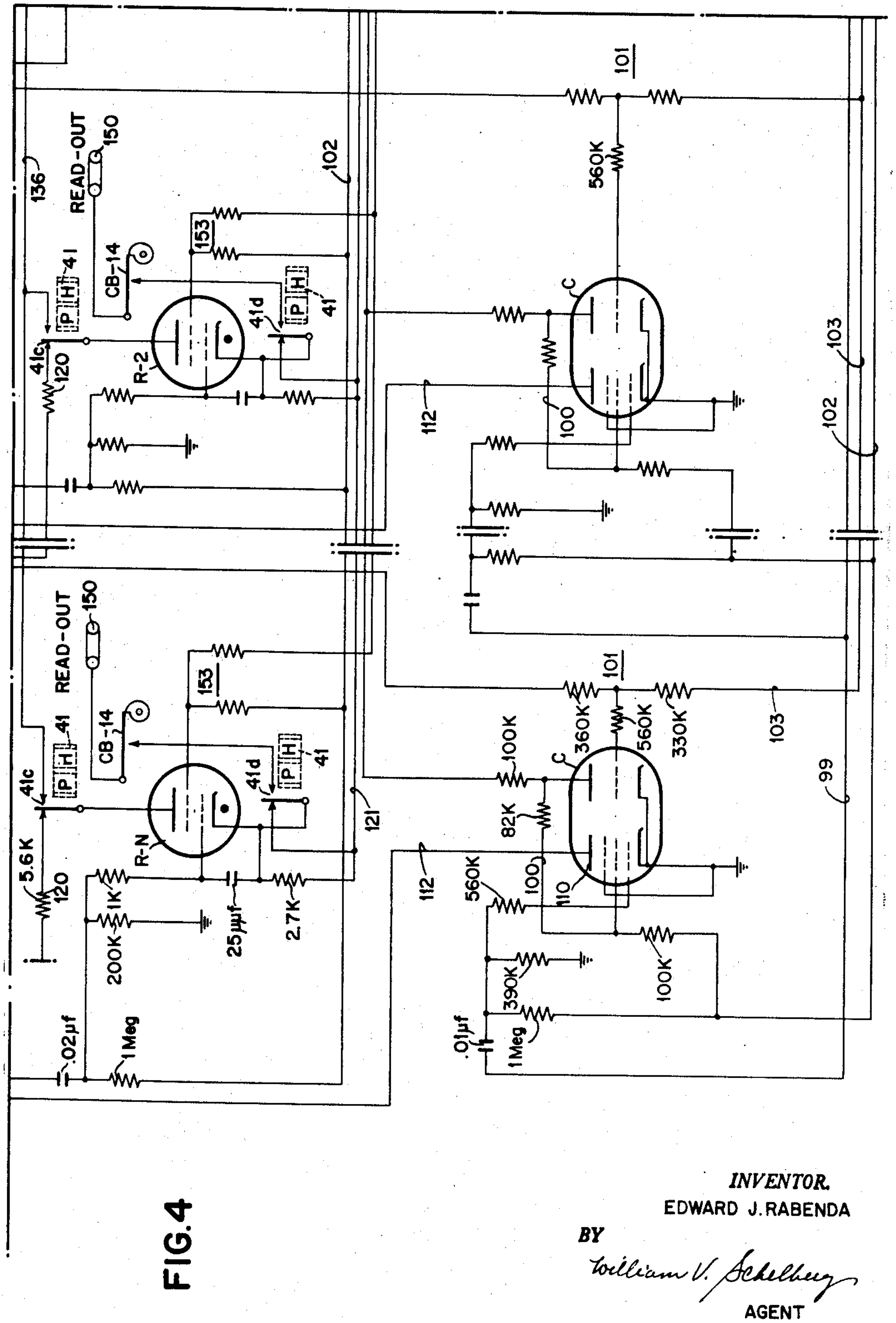
Figure 5:
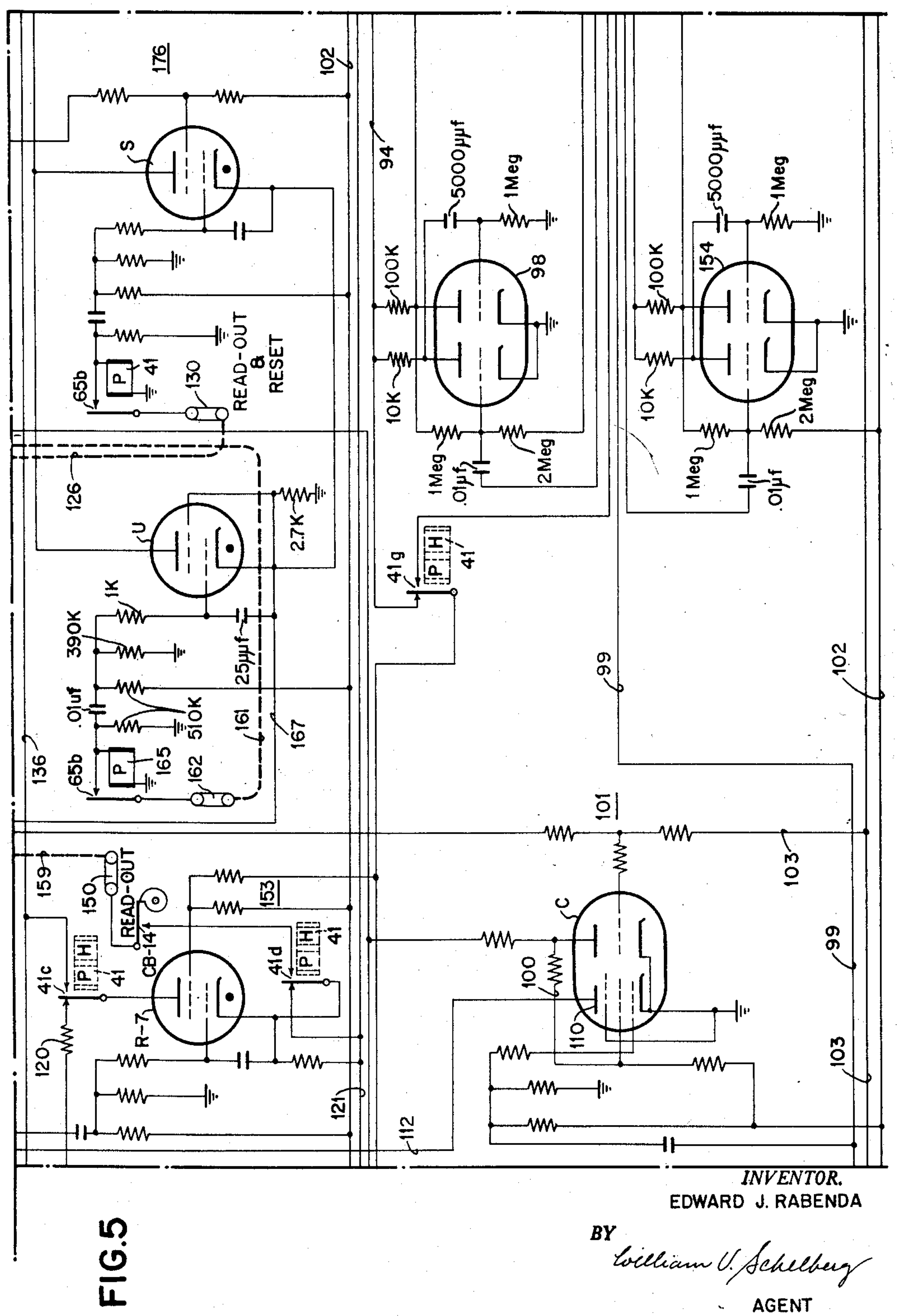

Carry is initiated by movement of the glow discharge from the D9 to the D0 cathode. When the D9 cathode sustains a glow discharge its voltage is held at approximately +210 volts and, as the glow transfers there is a resultant drop in voltage to approximately +135 volts which negative swing is applied through a lead 114 and condenser 115 to the primary winding 116 of a pulse transformer and to ground. A turns ratio of approximately 4 to 1 causes the secondary winding 117 to emit a pulse of sufficient magnitude to change the normally negative bias on the grid of a carry tube R provided for each denominational order, as shown in Figs. 4 and 5. This action may occur at any time during the cycle of accumulation when driving pulses are directed to the counter tubes G, however, as the carry tubes R are 2D21 gas tubes they remain in an "on" state after triggering. The plate of each tube R is connected through normally closed contact 41–*c* of the relay 41 (Fig. 3) and series resistor 120 to the junction of resistors 72 and 73 which couple the plate of the next higher order read in tube P and to the +135 volt line 43. The cathode of each tube R is connected to ground through contacts 41*d*, a lead 121 and a pair of cam operated contacts CB11 and CB12. As shown in the timing chart of Fig. 10, these contacts are closed at "0" machine index time or before the drive pulses for the counter are initiated and remain closed during accumulation until after the carry function has been effected by closure of contact CB13. CB13 makes every cycle to increase the negative bias on the lower terminal of the voltage divider 101, which is connected to the grid of the triode side of driver tube C, through the lead 103. The bias for the grid of the triode section of tube C remains sufficiently positive to keep this section conducting and prevent the pentode side from conducting to transmit the carry pulse to the counter tube G. If the next lower order position has had a carry initiated, however, and that carry tube R is turned on, then the potential at the upper end of the divider 101 is lowered and at the time CB13 closes and the potential applied to the lower end of the divider is changed, as described, the triode section is cut off. This action conditions the pentode side and a carry pulse applied to the grid of the pentode causes it to be triggered on. The carry pulse is developed by the photoelectric cell 93 (Fig. 6) as a pulse of light is allowed to pass a further slot in the disc 90 (Fig. 12*a*) after the "1" perforation representing position has been read. At carry time this pulse activates the tubes 97 and 98, as in the previously described entry function, and pulses the line 99 and the grid of the pentode section of tube C. This results in a change in the potential at the midpoint of the voltage divider 13 (Figs. 1 and 2) and a negative voltage swing in the transfer cathode circuit of the counter tube G causes the glow to advance to the next higher order digit cathode to complete the carry operation.

The tubes R and C, employed as described for the entry of information, are also used in a subsequent read out operation and in describing this function it is assumed that the adding and carry process has been completed. Read out action is initiated by the reading brush 16 sensing an "X" hole in a predetermined card column provided for this control purpose. As this occurs, a circuit is completed from the line 66, CF1 and CF2 contacts, the contact roller 18, a brush 16, a hub 125 and plugwire 126 connected to a read out and reset terminal 130 (Fig. 5). The control pulse is applied through contact 65–*b*, closed by relay 65 on operation of cam contacts CB4 (Fig. 3) as previously mentioned, to the grid circuit of a thyratron S. This tube is provided for controlling counter inversion circuits as will be described later to insure read out of a true figure should the value standing in the accumulator tubes G represent a credit balance. The control pulse also energizes the pick up winding 41P of a read out relay 41 connected between the contact side of the points 65*b* and ground. This closes the contacts 41*b* (Fig. 3) and a circuit is completed for the hold coil 41H from the +40 volt line 68, contacts of a cam switch CB3, contacts 41*b* and then to coil 41H and ground.

Each of the thyratrons R have a read out contact 41–*c* in its place circuit and a read out contact 41–*d* in its cathode circuit, as previously mentioned. The contacts 41–*c* in the energized position connect the plate to a lead 136 coupled through a pair of cam switches CB8 and CB9 to a line 137 maintained at +61 volts. The contacts of CB8 and CB9 make and break for each code digit as shown in the timing chart (Fig. 10). The read out contact 41–*d* in the cathode circuit, when energized, connect to individual cam operated contacts CB14, that are coupled to read out hubs 150.

Relay 41 is held energized for the period of read out and the following circuits are effected: read out contact 41–*e* (Fig. 6) are transferred and the voltage applied to the lower terminal of the dividers 101 is lowered to —100 volts; contact 41–*f* complete a circuit from the cathode of a photoelectric cell 151 and the grid of a 12AU7 tube designated 152; contacts 41*g* (Fig. 5) transfers one side of a resistor divider 153 connected to the grid of tube R from the +135 volt line 94 to the cathode of the tube 152; contacts 41–*h* (Fig. 6) close to complete a circuit from the cathode of a photoelectric pulse control tube 155 and the grid of tube 97.

Figure 12B:
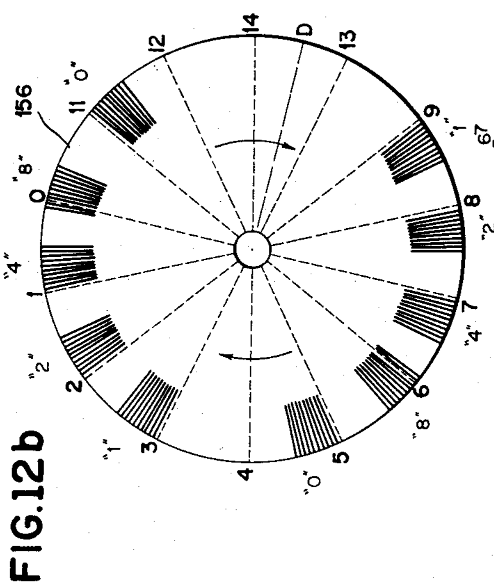

A disc 156 is provided for control of the photocell 155 and, as shown in Fig. 12*b*, is provided with ten slots for each index position for both the upper and lower deck of the card. As the disc 156 rotates, a series of ten pulses for each of the five index points (0—8—4—2—1) is originated as shown in the timing chart (Fig. 10).

Figure 12C:
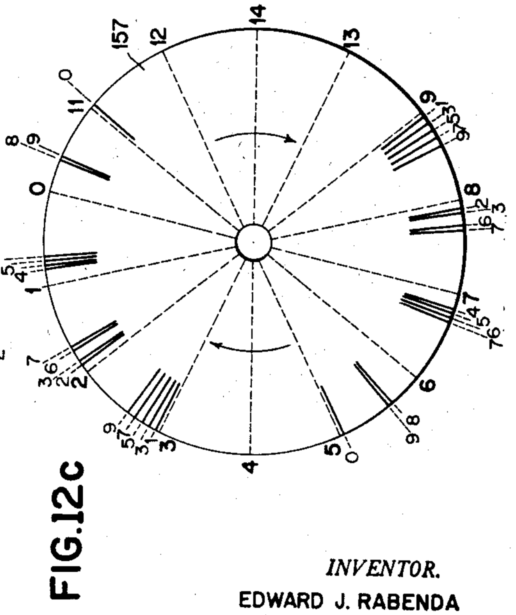

A further disc 157 is provided for control of the photocell 151 and, as shown in Fig. 12*c*, is provided with radial slots at the several index positions corresponding with the modified binary code employed for recording. The pulses produced by this disc are indicated graphically in Fig. 10 for each index position.

As the pulses developed by photocell 155 and disc 156 are applied to the tube 97 they are amplified and transmitted via lead 99 to the grid of the pentode section of tube C. The manner of transmission is the same as that described for addition, however, in the read out operation, the pulses occur in between the normal read in pulses as will be observed from the timing chart. Regardless of the value of the rigit cathode glowing in the counter tube G, the pentode side of the driver tube C will conduct fifty times and cause the glow to be transferred a like number of times with the final position being at its original starting point. During this operation, the glow transfers from the cathode D9 to cathode D0 five times and results in pulsing one grid of the read out tube R five times in the same manner as described for a carry function. The tube R will conduct, however, only when pulses on both its first and second grids are in coincidence and this occurs only on the binary combination of read out pulses on the second grid which are equivalent to the decimal value to be read out of the counter tube. Thus, when the pulse developed by the photocell 151 and disc 157 through tubes 152 and 154 and that developed by the transfer of glow from D9 to D0 as controlled by the photocell 155 and disc 156 are in coincidence, the tube R will conduct and develop one or more coded differential output pulses at the terminal 150.

Considering, for example, a "9" stored in the counter tube G. The binary combination "8" and "1" represents the decimal "9." This means that in reading out the stored "9," the tube R will become conducting for only two of the five pulses applied through the pulse transformer 116—117 to its first grid. The first of these represents the "8" part of the binary combination for "9" and the second the "1" part. This means that there will be a coincidence of the pulses from the tube 151 at two different times in the cycle, namely, 8 and 1 read out times. Referring to the timing chart it will be noted that one of the coincident pulses under each of two groups of read out pulses is designated by a 9, namely the group of read out pulses for an "8" and the "1" index. Beginning with the group of read out pulses for "8," the first pulse developed by disc 156 causes a transfer of the glow from D9 to D0 and there is a coincidence of pulses applied to both grids of tube R and it conducts during "8" read out time when CB14 closes to emit the "8" pulse to hub 150. The glow in the counter tube G always returns to its starting point at the end of each group of ten read out pulses. No coincidence of pulses occurs for group of read out pulses at "4" and "2" index positions but at the "1" index position the first pulse of this group transfers the glow from D9 to D0 again and tube R conducts at the time CB14 closes.

As a further example, with a "7" stored in the tube G, there will be a coincidence of pulses applied to both of the grids of tube R at three different intervals in the cycle, namely 4, 2 and 1 index times and it will be noted that one of the coincident pulses under these three groups is designated by a "7." Beginning with the group of read out pulses for a "4," the first pulse takes the glow off the D7 cathode, the second off the D8 cathode and the third off the D9 cathode causing the first grid of the tube R to be pulsed. At this instant there is a coincident pulse on the second grid. The same procedure follows for the "2" and "1" index groups of read out pulses.

The pulses developed on terminal 150 for each particular order are directed to the actuating magnets 37 of the recorder device shown in Fig. 8 through plugwires 159, only one such plugwire being illustrated for the first order. The recorder is operated in synchronism with the rotation of the discs 156 and 157 so that the record card in which the information is to be punched passes the punch position at corresponding index times.

The function of subtraction is initiated by the sensing of an X hole in a predetermined card column like the other control functions previously described. A circuit is completed, for example, from a brush 16 in the column position designated for subtraction, and a pulse is applied to hub 160, and through a plugwire 161 to a hub 162 (Fig. 5). This pulse energizes a subtract function relay 165 through contacts 65*b* of relay 65 and in addition triggers a thyratron U. Energization of relay 165 closes contacts to complete other circuits as follows: contacts 165*a* (Fig. 3) close to complete a circuit through the hold coil 165H and contacts 165*b* (Fig. 6) closes to complete a circuit from the cathode of photo tube 93 to the grid of tube 97. All accumulation in the counter tubes G is done by addition regardless of whether the amount is a debit or credit value. This is made possible by the structure of the counter tube itself and the feature of inversion. The inversion cathodes I are so arranged that a glow discharge on one of the digit cathodes is transferred to one representative of the nines complement value when the I cathodes are pulsed. At the time that the X perforation is sensed for subtraction control, the grid of the inversion and subtract control tube U is energized at a sufficiently positive value to overcome the negative bias normally maintained and this tube conducts since the plate circuit through CB10 is complete. As a consequence, a positive voltage appears at the cathode and is applied via a lead 167 to a first grid of a further inversion control tube W. This potential is applied while tube U is in a conducting state or for the duration of the accumulating portion of the cycle as controlled by the CB10 cam contact. This conditions the tube W for conduction in response to pulses applied to its second grid. For this purpose a further photoelectric cell 170 is provided (Fig. 3) with the inversion control disc 171 employed with it illustrated in Fig. 12*d*. As noted in the timing chart, the photocell 170, in conjunction with its associated amplifying system comprising tubes 172 and 173, transmits a pulse to the second grid of tube W through a lead 174. This tube now conducts for the duration of the inversion pulse and it is by this means that the counter tube glow is transferred or inverted to the complement value as the I cathodes are directly connected to the plate of tube W by a lead 175.

At the end of the accumulation of pulses which are equivalent to the credit value of the digit subtracted, the inversion control tube W is again pulsed by the photoelectric circuit including cell 170 and disc 171, and conducts for a second period to pulse the inversion cathode I and reinvert the represented value in the counter tubes G from its complement to its true value. After the reinversion is completed, cam contacts CB10 open and the tube U is rendered non-conductive, restoring the original negative bias to the first grid of tube W.

It will be noted that in this operation the photoelectric pulse control tube 170 transmits four pulses per machine cycle, however, the tube W conducts once for inversion and once for reinversion on the portion corresponding to the upper or lower deck in which the reading brush 16 senses the subtraction "X" control hole punched in the card.

Figure 2:
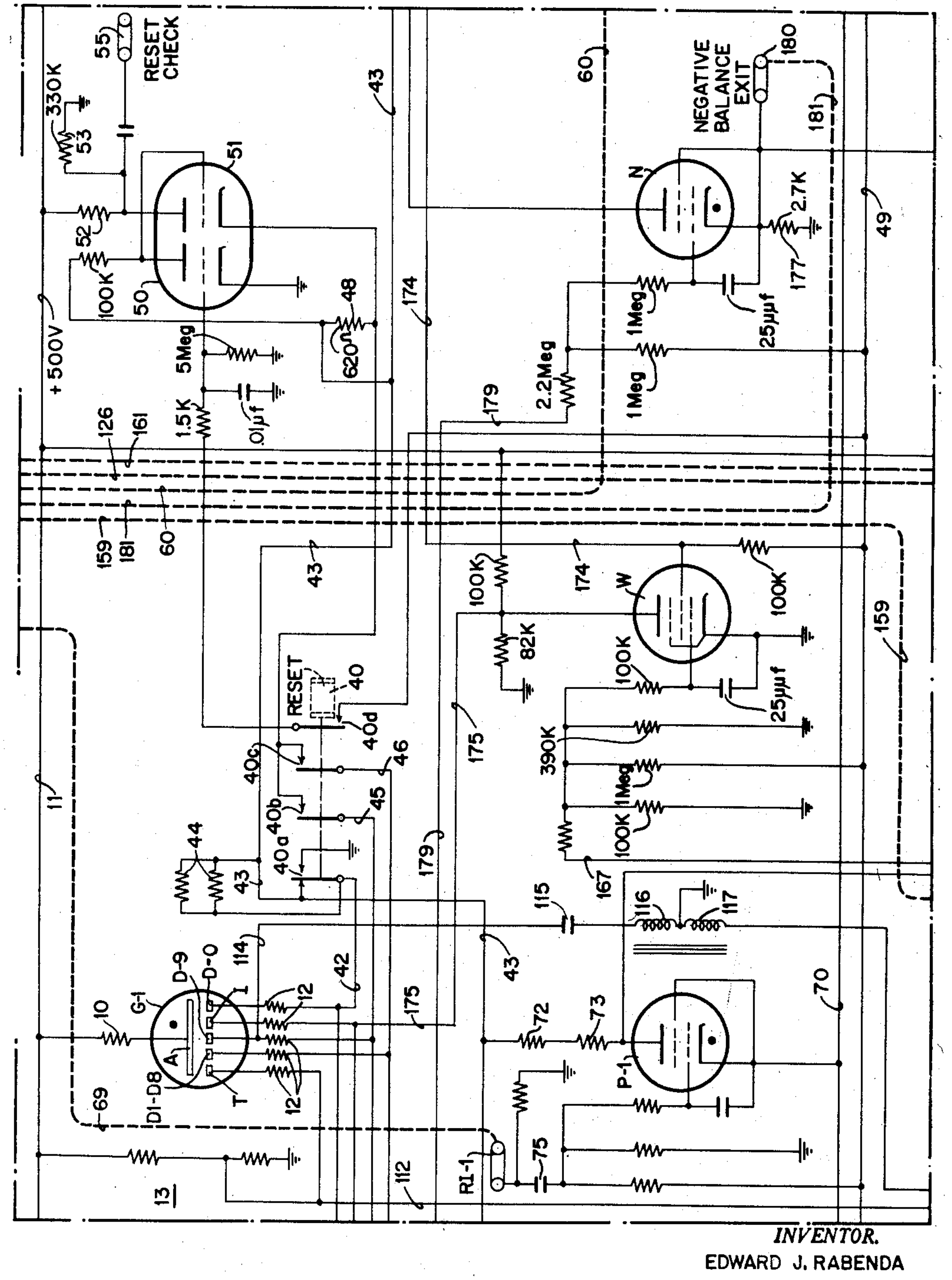

To indicate if a negative balance has resulted after a succession of accumulation operations, a negative balance exit thyratron N is provided as shown in Fig. 2. It will be recalled that at the same time that the read out relay 41 was energized, a positive pulse was applied to the first grid of the tube S and was sufficient to change the normally negative bias and condition this tube for conduction. The cathodes of both tubes S and U are commonly connected and connect through lead 167 to the first grid of the inversion control thyratron W to condition this tube for conduction when either tube U or S operates. When a subtract control X perforation is sensed and a positive pulse applied to the first grid of the inversion and subtract control thyratron U, it will always become conducting and condition the tube W, however, when the tube S receives a pulse on its first grid by the sensing of a read out control X perforation, this tube will become conducting only if the second grid has first been conditioned. This grid is connected to a resistor divider network 176 having one end coupled to the —100 volt line 102 and the other end connected to the cathode of the tube N and through resistor 177 to ground. The second grid of the tube S is normally maintained at a high negative bias unless the tube N conducts. Tube N conducts only when the cam contacts CB7 are closed and the highest order counter tube G–N has the D9 cathode glowing to indicate a negative balance, which raises the potential of the first grid through the connection labeled 179.

When the tube N conducts, a potential of approximately plus fifty volts is supplied to the upper terminal of the divider 176 ad biases the second grid of the tube S sufficiently positive to allow conduction should an X perforation read out control pulse be applied to the first grid. The resultant effect on the bias of the tube W causes an inversion of any negative balance in the counter group to a true figure balance and allows reading out of true fingers rather than complements.

As the tube N is rendered conductive as described, the voltage at the cathode increases and a positive pulse is provided at a terminal hub 180. This pulse may be used for such purposes as actuating the printing of the symbol CR, for example, or producing a perforation in a particular column of a card in which the information is recorded by punching. In the recorder illustrated in Fig. 8, the credit indicating perforation may be made in column 80, for example, by connecting the negative balance exit hub 180 to the punch operating magnet 37—80 by means of a plugwire 181.

In describing the organization and operation of the system, the code control discs shown in Fig. 12 have been adapted both to read in and read out information in the modified binary 1—2—4—8 code, however, it may be pointed out that this two way conversion is not essential. For example, with the code disc 157 slotted in accordance with the decimal code and disc 156 provided with ten slots for the 4 index position the information may be read out into a standard record card. Similarly, with the disc 90 slotted in accordance with the decimal code and the inversion and reinversion slots at the 3 and 4 index position on disc 171 eliminated, information may be read in from a standard card and read out for recording in the 1—2—4—8 code in either the upper or lower deck of an Increased Capacity Card. Further, the code employed may be modified so as to conform with any desired weighted code by appropriate arrangement of the groups and number of slots in the several discs.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an electronic decimal storage system, a plurality of denominationally ordered cold cathode decimal storage tubes, entering means therefor, means for sensing a succession of records containing ordered information represented by designations at selected index positions in accordance with a predetermined weighted binary code for determining said information, and means operable in synchronism with said sensing means for converting said coded information into decimal form and for causing said entering means to direct said decimal information to said storage tubes.

2. Apparatus as set forth in claim 1 wherein said means for converting said coded information comprises an opaque disc having slots arranged in plural groups about the periphery thereof with the number of slots in each said group provided in accordance with the value represented by the several index positions employed by said code, a light source and photoelectric cell arranged on opposite sides of said disc and aligned with said slots whereby discrete electrical impulses are developed in response to the rotation of said disc.

3. In an electronic decimal storage system, a plurality of denominationally ordered cold cathode decimal storage tubes, entering means and read out means therefor, means for sensing a succession of records containing ordered information represented by designations at selected index positions in accordance with a predetermined weighted binary code for determining said information and code converter means operable in synchronism with said sensing means for causing said entering means to direct said information to said storage tubes, recording means for recording on a medium information represented by designations at selected index positions in accordance with a weighted binary code, and means operable in synchronism with said recording means for controlling said read out means to deliver said stored decimal information in accordance with said code designations.

4. Apparatus as set forth in claim 3 wherein said code converter means operable in synchronism with said recording means comprises an opaque disc having radial slots arranged in plural groups about the periphery thereof with the number of slots in each said group provided in accordance with the value represented by the index postions employed by said code.

5. In an electronic decimal storage system, a plurality of denominationally ordered cold cathode decade storage tubes, entering means and read out means therefor, means for sensing a succession of records containing ordered information represented by designations at selected index positions in accordance with a predetermined weighted binary code for determining said information, means operable in synchronism with said sensing means for converting said coded information into decimal form and for causing said entering means to direct said decimal information to said storage tubes, recording means for recording on a medium information in accordance with said code, means operable in synchronism with said recording means for controlling said read out means to deliver said stored decimal information thereto in accordance with said code for recording in a second record means.

6. Apparatus as set forth in claim 5 wherein said means operable in synchronism with said sensing means and said means operable in synchronism with said recording means comprise rotatable opaque discs having translucent radial slots arranged in plural groups about the periphery thereof.

7. In a record controlled calculator having a decimal accumulator, each denominational order of which is responsive to electrical impulses with each impulse applied thereto causing the accumulator to manifest the next succeeding digit, the combination with means for developing plural groups of impulses including binary coded record controlled code converter means, and means for selectively directing certain of said impulses of at least one of said groups to said accumulators to effect an advance thereof in accordance with the decimal equivalent of said code.

8. Apparatus as set forth in claim 7 wherein said binary coded record controlled code converter means incudes an opaque disc having radial slots extending about the periphery thereof with said slots arranged in correspondence with said code.

9. In a record controlled calculator having a multiordered decimal accumulator, each denominational order of which is responsive to electrical impulses with each impulse applied thereto causing the accumulator to manifest the next succeeding digit, the combination with means for developing plural groups of ten impulses and applying said impulses to said accumulator orders to advance said accumulator through a series of complete cycles, means for developing an output impulse from said accumulator as it advances past a predetermined manifestation, and means operable to provide electrical impulses in coincidence with certain of said output impulses in accordance with a predetermined weighted binary code.

10. Apparatus as set forth in claim 9 wherein said means for developing plural groups of ten impulses comprises an opaque disc having groups of ten radial slots positioned about the periphery thereof and arranged in accordance with the index positions of said predetermined code.

11. Apparatus as set forth in claim 10 wherein said means operable to provide electrical impulses in coincidence with certain of said output impulses comprises a further opaque disc having groups of radial slots positioned about the periphery with the number of groups corresponding to the number of index positions of said code and the number of slots in each group corresponding to the weighted value of the index positions.

12. Apparatus for generating electrical impulses in accordance with a predetermined code having index positions of weighted values comprising an opaque disc member, a light source and a photoelectric cell arranged on opposite sides of said disc and in alignment with a like portion of the same radius thereof, groups of slots extending in a radial direction from the periphery of said disc with the number of said groups conforming to the number of index positions of said code and the number of slots in said groups being related to the weighted value of each said index position, means for rotating said disc whereupon said photoelectric cell is activated to produce a number of impluses corresponding with said weighted values for each said index position, electronic gate means coupled to said photoelectric cell, and means for selectively unblocking said gate means for a time interval corresponding with rotation of said disc through at least one of said index positions.

13. In a record controlled calculator having a decimal accumulator, each denominational order of which is responsive to electrical impulses with each impulse applied thereto causing the accumulator to advance to the next succeeding digit, the combination with means for generating electrical impulses in accordance with a predetermined code having index positions of weighted valves comprising an opaque disc member, a light source and a photoelectric cell arranged on opposite sides of said disc and in alignment with a like portion of the same radius thereof, groups of slots extending in a radial direction from the periphery of said disc with the number of groups conforming to the number of index positions of a code and the number of slots in each said groups related to the weighted value of each said index position, and means for directing certain groups of said impulses to said accumulator on sensing a record bearing binary designations in accordance with said code.

14. Apparatus for generating electrical impulses in accordance with a predetermined code having index positions of weighted valves for application to a decimal accumulator device, said apparatus comprising an opaque disc member, a light source and a photoelectric cell arranged on opposite sides of said disc and in alignment with a like portion of the same radius thereof, groups of slots extending in a radial direction from the periphery of said disc with the number of said groups conforming to the number of index positions of said code and the number of slots in said groups related to the weighted value of each said index position, and means for sensing a record having information designations in accordance with said code for applying certain of said impulses developed by said photoelectric cell to said decimal accumulator.

References Cited in the file of this patent

UNITED STATES PATENTS

| | | |
|---|---|---|
| 1,931,852 | Reichel et al. | Oct. 24, 1933 |
| 2,377,762 | Daly | June 5, 1945 |

UNITED STATES PATENT OFFICE

CERTIFICATE OF CORRECTION

Patent No. 2,928,594 March 15, 1960

Edward J. Rabenda

It is hereby certified that error appears in the printed specification of the above numbered patent requiring correction and that the said Letters Patent should read as corrected below.

Column 12, lines 47 and 48, for "incudes" read -- includes --; column 13, line 16, for "impluses" read -- impulses --; same column 13, line 29, and column 14, line 11, for "valves", each occurrence, read -- values --;

Signed and sealed this 11th day of April 1961.

(SEAL)
Attest:

ERNEST W. SWIDER
Attesting Officer

ARTHUR W. CROCKER
Acting Commissioner of Patents